April 30, 1940.   H. THOMA   2,198,891
POWER TRANSMISSION
Filed Oct. 11, 1934   5 Sheets-Sheet 1

Fig.1.

INVENTOR
HANS THOMA
BY
ATTORNEY

April 30, 1940.   H. THOMA   2,198,891
POWER TRANSMISSION
Filed Oct. 11, 1934   5 Sheets-Sheet 2

INVENTOR
HANS THOMA
BY
ATTORNEY

April 30, 1940. H. THOMA 2,198,891
POWER TRANSMISSION
Filed Oct. 11, 1934 5 Sheets-Sheet 4

INVENTOR
HANS THOMA

Patented Apr. 30, 1940

2,198,891

UNITED STATES PATENT OFFICE 2,198,891

POWER TRANSMISSION

Hans Thoma, Karlsruhe, Baden, Germany

Application October 11, 1934, Serial No. 747,833

10 Claims. (Cl. 60—53)

This invention relates to improvements in power transmissions, and has for an object to provide a transmission device adapted to perform the functions of the usual clutch and transmission mechanism of automobiles, although the invention is capable of application to aeroplanes, boats, ships, locomotives, machine tools and any other devices where it is desired to control the utilization of power delivered by a prime mover. Among the requirements to be satisfied by such devices is that the energy delivered by a power supply shaft is transmitted to a power delivery shaft at variable speeds and with a torque varying inversely as the ratio of the speed of the power delivery shaft to the speed of the power supply shaft.

It is another object of this invention to secure these results by hydraulic means consisting of a hydraulic displacement device which at certain times delivers a fluid such as oil to another hydraulic displacement device, and vice versa.

A further object is the provision in a hydraulic transmission mechanism of a hydraulic displacement device which under varying conditions operates as a pump, as a hydraulic coupling, as a hydraulic motor, as a hydraulic brake, or merely idles.

Another object is the provision of suitable valve mechanism for controlling the flow of the working fluid, and automatic and/or manual means for controlling said valve mechanism.

Another object is the provision of such a transmission mechanism so constructed and arranged that the major portion of the mechanism rotates at the same speed as the power supply shaft so that said mechanism will serve the purpose of the usual fly-wheel necessary in connection with certain prime movers such as internal combustion engines.

Another object is to provide such a hydraulic transmission which may be manually controlled to provide a plurality of speed-torque ratios under manual control but which can be readily adapted for automatic operation under the control of speed responsive devices.

Another object is to provide such a transmission furnishing at least three speed-torque ratios with only two hydraulic displacement devices.

Another object is to provide such a transmission having an overdrive, for driving the driven shaft at a greater speed than the driving shaft.

Another object is to provide such a device, adapted at certain times to be used as a hydraulic brake.

Another object is to provide means for controlling the operation of such a transmission operated by the speed of the engine and/or the car and preferably modified by the extent of opening of the throttle of the engine and/or provided with manual modifying means.

Another object is to provide such a transmission mechanism adapted for cooperation with a mechanical transmission means of known or suitable construction.

Other objects are to improve the construction, to reduce the cost thereof and to provide such a mechanism which is reliable and durable, and operates with high over-all efficiency.

The characteristics of the present invention are exemplified by the device shown in the accompanying drawings, wherein.

In said drawings, the numeral 21 represents a power supply shaft which may be any means for delivering power to the transmission and which, when the transmission is used for automobiles, may be the usual crank shaft of the motor. Firmly attached thereto is the disc 22 carrying disc 22a which carries disc 22b which may carry the usual ring gear 23 to cooperate with the usual starting motor of the automobile. Firmly attached to said disc 22b as by a series of bolts 24 are the discs 25, 26, 27 and 28.

Figure 1:
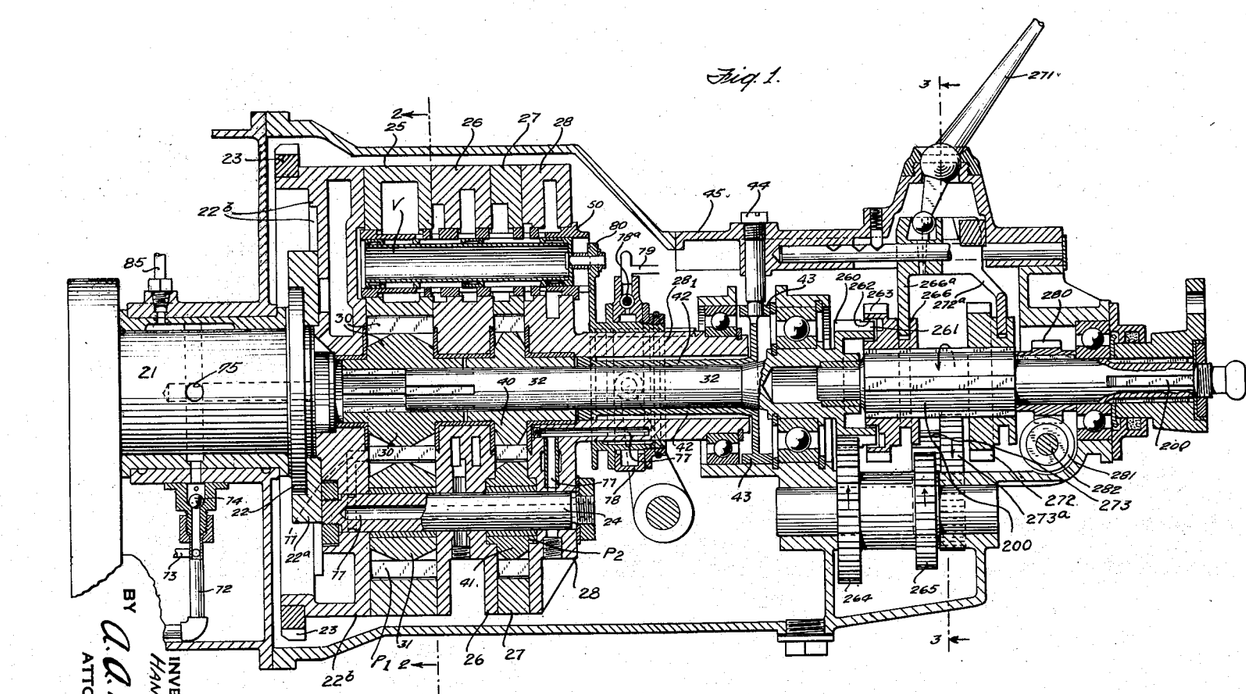
Fig. 1 represents an illustrative embodiment of the invention in generally vertical longitudinal section, the section through the hydraulic devices being taken on the line 1—1 of Fig. 2.
Figures 2, 3:
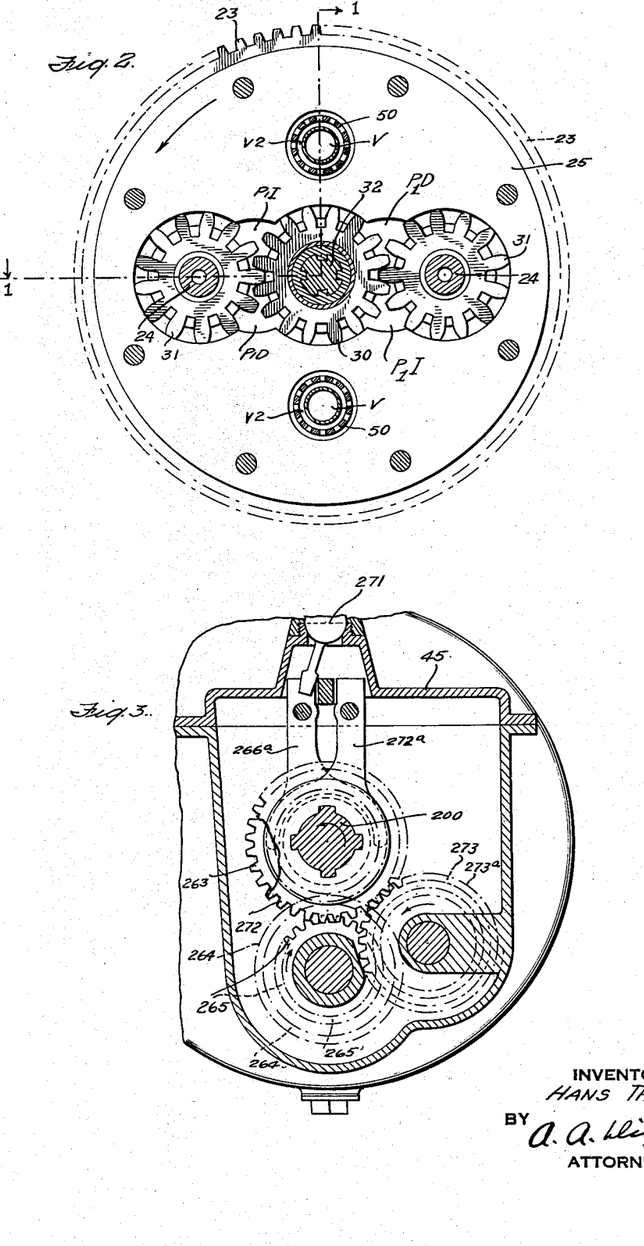
Fig. 2 is a cross section taken on the line 2—2 of Fig. 1 looking in the direction of the arrows.
Fig. 3 illustrates any suitable supplementary mechanical transmission device being taken on line 3—3 of Fig. 1.
Figure 4:
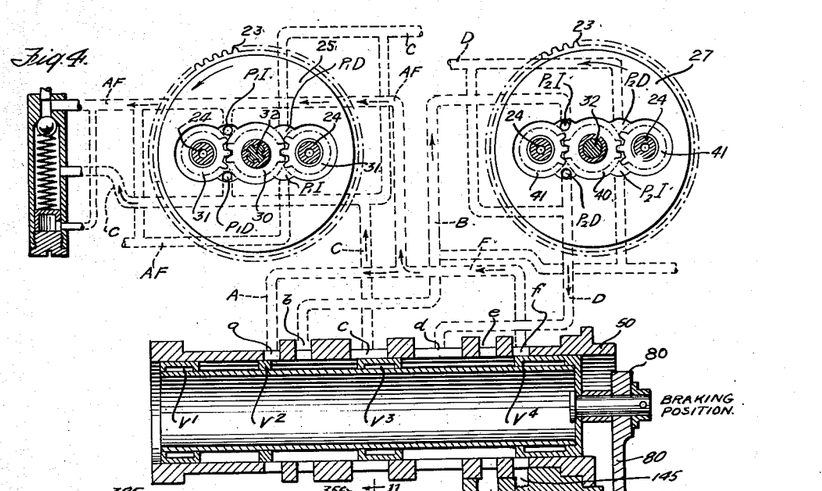
Fig. 4 is a schematic view showing the control valve in the braking position, i. e., where the propeller shaft speed is being retarded.

In the form illustrated, the hydraulic displacement device generally indicated by the numeral $P_1$, consists of the central sun gear 30 meshing with one or more planetary gears 31, in the present instance shown as two in number, see Figs. 1, 2 and 4. The sun gear 30 is journaled coaxially with the shaft 21 and is connected for rotation with the power delivery shaft 32. The plate 25 is cut away at its center to provide clearance for the gear 30 and also has two preferably oppositely spaced circular clearance spaces for receiving the gears 31. Said plate 25 is also provided with clearance spaces $P_1I$ and $P_1D$ which serve as fluid passages. It will be readily understood that any relative rotation of the gear 30 to the plate 25 will cause a rotation of the gear 30 relative to the gears 31 whereby the gears 30 and 31 will operate as a pump. The rearward side of said fluid pump or other hydraulic displacement device $P_1$ is closed by the plate 26.

The hydraulic displacement device generally designated $P_2$, as shown more specifically in Figs. 1, 2 and 4, acts under certain conditions as a motor and comprises a central sun gear 40 mounted coaxially with the shaft 32 and between the plates 26 and 28. Said plates 26 and 28 are separated by the plate 27 which has central and eccentric cut-out portions similar to those in plate 25. Surrounding said gear 40 are one or more gears 41 (here shown as two in number), each meshing with the gear 40. The planetary gears 31 and 41 are journaled for rotation upon suitable shafts, which in the form shown are the bolts 24 which as stated above also hold the discs 22b, 25, 26, 27 and 28 together.

The sun gear 40 is shown as connected, as by a square jaw clutch, to a sleeve 42, which may be rigidly connected to the housing 45 through suitable means such as a set screw 44 engaging a flange 43 on said sleeve 42. In the particular form of the invention shown in the drawings the sun gear 40 will, therefore, always be stationary.

One or more working fluid control valves V are provided. As shown these are piston valves which are longitudinally movable in valve port sleeves 50 rigidly mounted in a suitable opening in the discs 25, 26, 27 and 28. The valves are shown provided with suitable enlargements or collars $V_1$, $V_2$, $V_3$ and $V_4$ which cooperate with suitable ports as $a$, $b$, $c$, $d$, $e$ and $f$ in said port sleeve 50. Said ports are connected through passages, located for the most part in the discs 22b, 25, 26, 27 and 28 to the intake and delivery sides of the devices $P_1$ and $P_2$, in a manner which is apparent from Fig. 4 where said passages are shown schematically. As shown in Fig. 4 the normal fluid delivery side $P_1D$ of $P_1$ is connected to the port $c$ by passage C and the normal fluid intake $P_1I$ of $P_1$ is connected through passage AF to passages A and F which connect with ports $a$ and $f$, respectively. Also the normal fluid delivery side $P_2D$ of $P_2$ is connected to port $d$ by passage D and its intake side $P_2I$ to port $b$ by passage B. The opening $e$ is not connected directly to the devices $P_1$ or $P_2$ and it comes into operation only while using the hydraulic brake.

From the preceding description, it will be noted that the parts 21, 22, 22a, 22b, 24, 25, 26, 27 and 28 all rotate together, their masses serving as a flywheel and carrying along with them gears 31 and 41 as well as the valves V. In the absence of working fluid, or when working fluid is present and it is free to circulate as desired, it is obvious that rotation of the shaft 21 will not impart rotation to shaft 32.

In order to provide for various speed ratios between shafts 21 and 32, it is merely necessary to control the flow of the working fluid. This is accomplished by means of valves V. In neutral position (see Fig. 5) the working fluid is allowed to circulate freely from the delivery side of the device $P_1$ to the intake side of device $P_1$. The rotation of gears 31 around the gear 30 will therefore not have any effect upon gear 30. Similarly, the circulation between $P_2D$ (Fig. 4) and $P_2I$ (Fig. 4) is unobstructed. The gear 40, being held stationary, will merely cause oil to be pumped idly.

Figure 6:
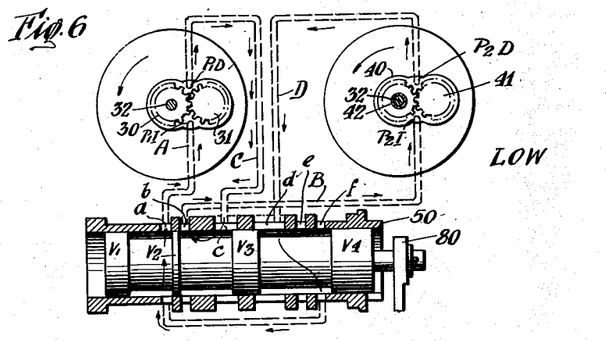
Fig. 6 is such a view showing the valve in the position where power is transmitted at a reduced speed ratio and an increased torque ratio.

If now the valve V is moved to such a position (see Fig. 6) that the delivery passages $P_1D$ of the device $P_1$ are connected to the intake passages $P_2I$ of the device $P_2$ and the delivery passages $P_2D$ of the device $P_2$ are connected to the intake passages $P_1I$ of device $P_1$, the device $P_1$ will act as a pump and will pump the working fluid through device $P_2$ which now acts as a motor. The capacity of $P_2$ being less than that of $P_1$, some of the oil which is pumped by $P_1$ per revolution cannot be accommodated by $P_2$, as a result of which part of the motion of the driving shaft 21 must be passed on to the driven shaft 32 which therefore operates at a fraction of the speed of the engine. The oil pressure acting in $P_2$ between the abutment provided by the stationary gear 40 and the gears 41 serves to add torque to the driving shaft which is in turn passed on to the driven shaft, thus increasing the torque of the driven shaft in proportion to its reduced speed ratio.

For direct drive (see Fig. 7) it is merely necessary to block flow of oil from the delivery side $P_1D$ of $P_1$ to the intake side $P_1I$, whereupon the sun gear 30 and the shaft 32 will be carried along at engine speed. At this time the delivery and intake sides of $P_2$ may be connected so that the oil is merely pumped idly.

For over-drive $P_2$ is caused to pump working fluid into that side of $P_1$ which normally is the delivery side with the result that gear 30 and shaft 32 are caused to rotate at a speed higher than engine speed, with, of course, a corresponding decrease in torque.

The operation of valve V will now be described with special reference to Figs. 4 to 8 inclusive.

Figure 5:
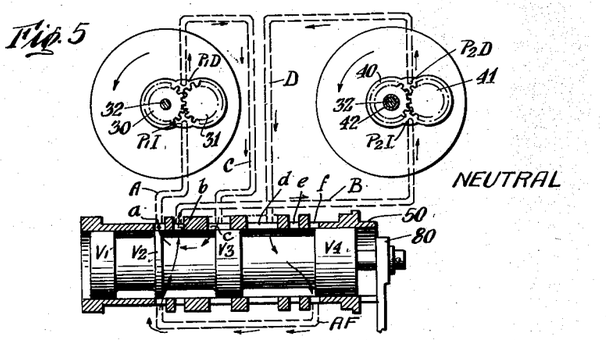
Fig. 5 shows a view similar to Fig. 4 with the valve in the neutral position, i. e., where no power is transmitted.

We will first assume that the valve or valves V are in the position shown in Fig. 5. It will be readily seen that both $P_1$ and $P_2$ are short circuited. $P_1$ may pump oil from its delivery side $P_1D$ in through port $c$ and out of port $a$ back to the intake side $P_1I$. Similarly $P_2$ may pump oil from its delivery side $P_2D$ in through port $d$, out of port $f$, back into port $a$, out through port $b$ and back to its intake side $P_2I$. When the piston V is moved toward the rear to the position shown in Fig. 6 the low ratio drive is provided for. In this condition $P_1$ pumps oil in through ports $c$ out through port $b$ to the intake side of $P_2$ which acts as a motor and increases the torque of the driving shaft, thus providing a reduced ratio with torque increase. Upon leaving the delivery side $P_2D$ the oil passes through D, in through port $d$ and out through port $f$ back to $P_1$.

Figure 7:
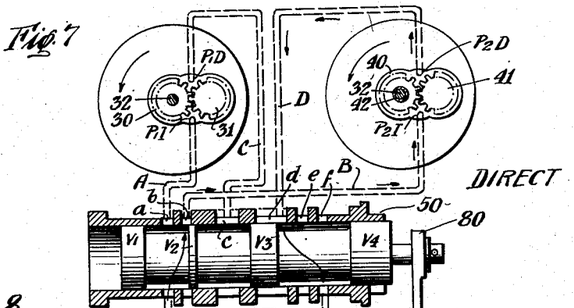
Fig. 7 shows the valve in position for direct drive of the power delivery shaft by the power supply shaft.

When the valve V is moved to the position shown in Fig. 7 the delivery side of P₁ is blocked thus causing the driven shaft 32 to be carried along at the speed of shaft 21. The oil pumped by P₂ passes in at $d$ out at $f$ in at $a$ out at $b$ and back to P₂.

Figure 8:
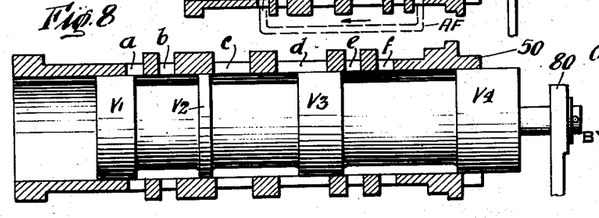
Fig. 8 shows the valve in over-drive position.
Figures 9, 9A:
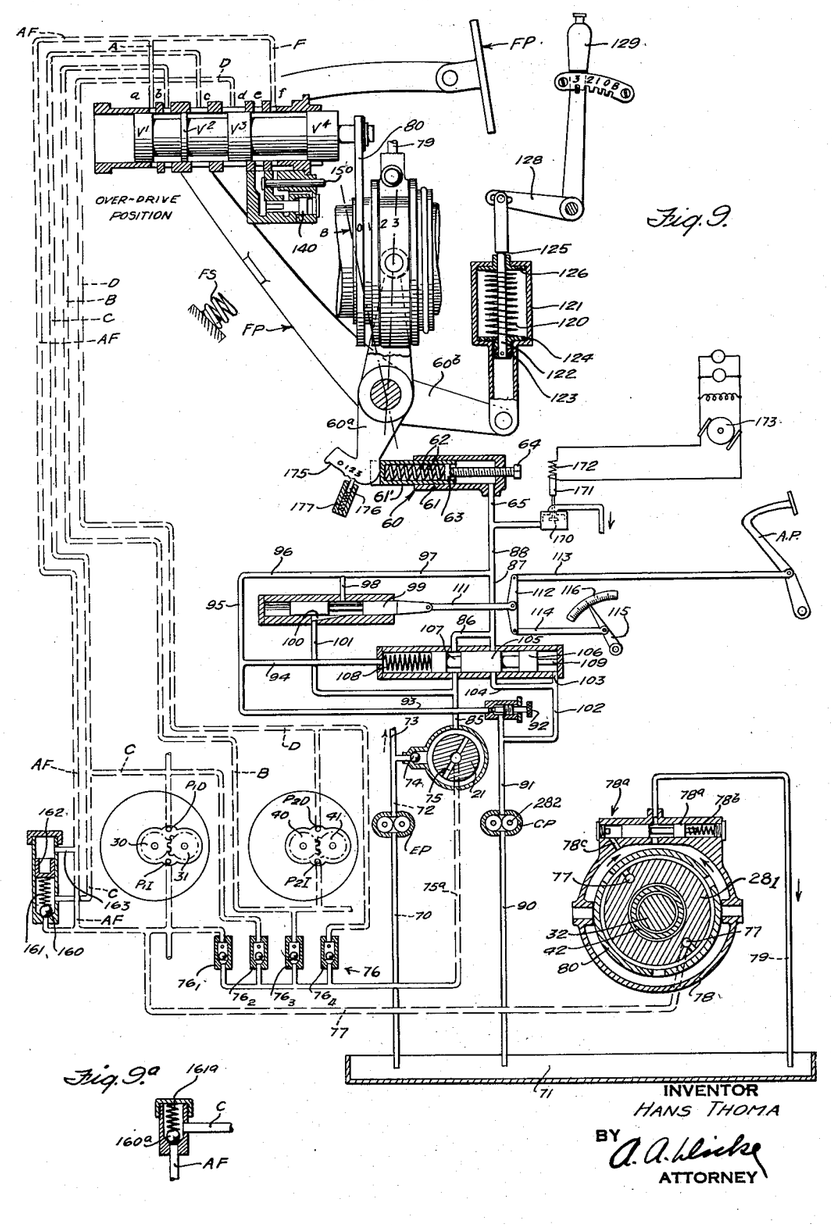
Fig. 9 is a partly schematic view similar to Fig. 4 with the control valve in the over-drive position (Fig. 8) and also showing oil supply pumps and connections for changing the working fluid and for controlling the positioning of the control valves.
Fig. 9a shows a modification of part of the mechanism of Fig. 9.

With the valve V in the position of Figs. 8 and 9 P₂ acts as a pump and pumps oil into the delivery side of P₁ (in through port $d$ and out through port $c$), then through P₁ and out at P₁I (in through port $a$ and out through port $b$) and back to the intake side of P₂. Thus an over-drive at lower torque is achieved.

The means for controlling the position of valve V will now be described.

Figures 10, 11:
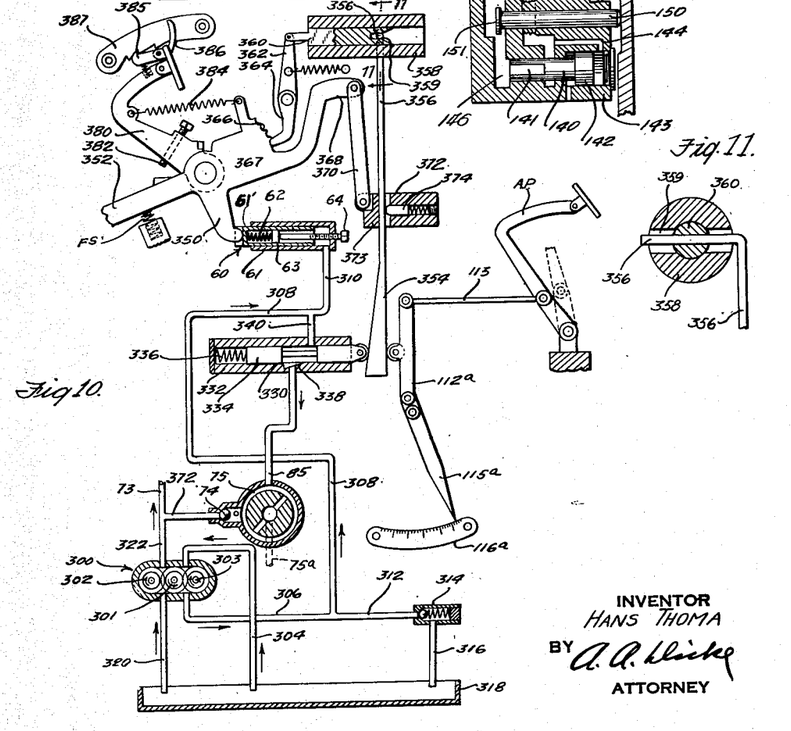
Fig. 10 is a partly schematic view similar to Fig. 9 but showing a modified valve controlling means.
Fig. 11 is a detail cross-sectional view taken on the line 11—11 of Fig. 10.

The various required positions of valve V may be secured manually or by any suitable control means. One such means is shown in Fig. 9 and a modified form is shown in Fig. 10.

Referring to Fig. 9 the device 60 is any suitable fluid pressure actuated device such as a piston 61' operating in cylinder 61. In order to furnish adjustment the spring 62 may be provided, 63 as any suitable spring support and 64 an adjustment device such as a set screw.

In the form shown the control of the valves V is effected by (a) speed of driving shaft, (b) speed of driven shaft, (c) extent of throttle opening (d) a settable over-riding control determining the limits within which automatic speed ratio changes may be made, (e) a manual setting device to vary the speed at which the change of valve position will occur, and (f) a manually operable over-riding control device such as the foot pedal FP for forcing at will a lower speed ratio than that called for by the automatic control device, including neutral and also hydraulic braking.

EP is any suitable pump such as the usual lubricating oil supply pump of an automobile engine serving to draw oil through intake passage 70 from a suitable reservoir 71 which may be the usual crank case oil sump of an automobile engine. When the motor runs, oil is delivered through passages 72, 73 to the bearings of the motor, etc. in the usual way and through check valve 74 into the rear engine bearing and around the engine shaft into the transmission through passages 75 and 75a and through check valves 76 into various parts of the transmission. As shown there are four such check valves, 76₁, connected to P₁I, 76₂ connected to P₁D, 76₃ connected to P₂I and 76₄ connected to P₂D. Not all of these are necessary but by providing these four, entry of fresh cool oil into the transmission is assured under all conditions of operation as not all of the passages P₁I, P₁D, P₂I or P₂D are under high pressure at any one time. Oil discharge may occur from P₁I, as shown, through passage 77 which may be formed in part in one of the connecting bolts 24, as appears from Fig. 1. Another part of said passage 77 lies in the rearward tubular extension 28₁ of the disc 28. As shown in Fig. 1 the member 28₁ carries for rotation therewith the valve operating spider 80 mounted upon which is the non-rotary collecting ring 78 (Figs. 1 and 9). The oil which enters said ring from said passage 77 passes from said collecting ring 78 through passage 79 back to the crankcase, although it is preferably first led into the mechanical transmission for lubrication purposes and then permitted to drain back into the crankcase. Upon reversal of torque, as when the car drives the motor, P₁I becomes subjected to high pressure. In order to avoid the escape of too much oil under these conditions the valve 78a may be provided. It is normally held in the position shown, by spring 78b but if the pressure exerted through passage 78c exceeds a certain value it moves the valve 78a to the right and cuts off the egress of the oil (through 79) or reduces it to a proper value.

After the transmission is properly filled oil is forced through passages 85, 86, 87, 88 and 65 into cylinder 61. When the pressure rises sufficiently the piston 61' is pressed outwardly, thus moving the valves V gradually to the low speed position and thus gradually starting the car in motion.

In the form shown a second oil control pump CP driven in association with the Cardan shaft 200 is provided. This pump does not begin to operate until the car moves. The oil pressure furnished thereby may work in cooperation with that of pump EP or in substitution therefor as shown. Pump CP is shown as drawing oil from the reservoir through passage 90 and pumping it through passage 91, adjustable throttle valve 92, passages 93, 95, 96, 97, 88 and 65 to cylinder 61, where it exerts a certain pressure. Some of the oil passes from 96 through 98, metering valve 100, passages 101 and 85 into the rear crankshaft bearing and then into the transmission proper. When the speed of pump CP has reached a certain value the pressure drop at the throttle valve 92 reaches a value at which the control valve piston 105, slidably mounted in a cylinder, as shown, is moved to the left (Fig. 9) against the action of spring 108 through application of pressure through passages 102 and 103. This motion causes the reduced section 107 to be moved to the left cutting off communication between 85 and 86, and opening a passage from 102 through 104 to 87. The speed of pump CP influenced to a certain degree by the speed of pump EP will now determine the pressure on piston 61' and the setting of valves V.

As shown in Fig. 9 a connecting tube or passage 94 may be provided between passage 95 and the cylinder space to the left of piston valve 105, 106, 107 whereby the said piston valve will be influenced by the pressure drop at the throttling valve 92 as well as by the spring 108.

Further automatic control under the influence of the accelerator pedal A. P. or other suitable throttle control may be effected by varying the opening of metering valve 100. This valve may comprise the piston valve 99 cooperating with a generally V-shaped valve port so that the area of the opening will be varied as required, by the position of the piston 99. The latter may be positioned by a link 111 connected to a lever 112 one end of which is connected by link 113 with the throttle opening (accelerator) pedal A. P. To secure adjustment the other end of lever 112 may be connected as by link 114 to lever 115 adjustable over an indicating scale 116, the lever 115 and scale 116 being preferably located on the instrument board. The lever 115 will, of course, be held in the position to which it is set by the operator by any suitable means such as friction at its pivot, or by any other suitable holding means.

In this way the car speed at which speed ratio changes are caused to occur is made dependent upon the throttle opening. For example, if the car is running on level ground and a certain speed is reached with a small throttle opening the valve 100 is almost closed so that the pressure in cylinder 61 is comparatively high and shifting to a higher speed ratio occurs at a lower speed. If the pedal A. P. is depressed a substantial amount as on a hill the opening of valve 100 is greater and shifting does not occur until a higher speed is reached. Furthermore, if the lever 115 is set to the extreme counterclockwise position the valve 100 is so far open that not sufficient pressure is developed in the cylinder 61 to shift the valve out of neutral position.

To furnish a further manual control the piston 61' is preferably caused to operate against a spring 120 the setting of which may be readily adjusted manually. Such a construction is shown in Fig. 9. The spring 120 is preferably located within an oil filled housing 121 connected at one end to an arm 60b associated with the foot pedal FP and receiving a rod 122 having a shoulder 123 against which bears the disc 124 and formed with a second spaced shoulder 125 and serving as a seat for a second disc 126, between which and the disc 124 the spring 120 is located. The casing is preferably filled with oil to provide a damping action. The rod 122 may be connected to a member 128 of a setting device 129 which may be held in, say, five positions of adjustment, brake, "neutral," "low," "direct" and "over-drive." If in the latter position, the valves V remain in "over-drive" position (assuming that the foot pedal FP is not depressed). If in "direct" position it is automatic in operation as between direct and over-drive. When in "low" position, the automatic operation is limited to direct and over-drive. When in "neutral" position, the transmission will be fully automatic. When in "brake" position the hydraulic brake may be made effective. These results are, of course, produced by the balance between the spring 120 and the pressure on plunger 60. It will be noted that this arrangement will permit of elongation or shortening of the connection between 128 and 60b, each being resisted by spring 120.

Positive, over-riding control can be secured by depressing the pedal FP to the desired extent to secure in succession direct, low, neutral and, if depressed all the way, so as to force the valves V to the position of Fig. 4, a hydraulic braking action is secured. To prevent unintentional application of the brake it is preferred to supply a relatively strong spring FS which is effective only between the "neutral" and "braking" positions of pedal FP.

*Hydraulic braking*

When the valves V are in the position shown in Fig. 4 hydraulic breaking occurs. At this time the engine throttle will, of course, be closed and the engine will attempt to idle. The flow of oil is shown in Fig. 4 by arrows. It will be noted that the flow from d to f is almost cut off so that a high pressure (say 150 atmospheres) is present at P₂D and the passages connected therewith, whereas the pressure at P₂I is much less (say 50 atmospheres). This pressure difference is due to the fact that the pump gears 41 are revolved around the stationary pump gear 40, pumping oil which is throttled at the point f. This pressure difference obviously results in a great deceleration torque which is transferred to the chassis through the sun gear 40 which is rigidly connected to the housing 45 as described above. However, this decelerating torque is applied to the engine whereas it should be applied to the car itself as otherwise the only effect of this hydraulic braking would be to stop the engine or to rotate it reversely. It is necessary to decelerate the car itself, i. e., shaft 32. As the flywheel is decelerated the motor runs slower than the shaft 32 and as the relative rotation is reversed the normal suction P₁I of the large pump becomes the pressure side (a pressure of say 50 atmospheres) whereas P₁D is under considerably lower pressure. This pressure difference applies a forward torque to the motor whereas the throttling of P₂ applies a reverse torque. So that the motor speed may not be too low nor too high the pressure differences should be maintained at a certain value. Assuming that P₁ has about twice the displacement of P₂ the following pressure condition might be regarded as typical. P₂D say 150 atmos., P₂I say 50 atmos. (difference 100 atmos.), P₁I say 50 atmos., P₁D say 1 atmos. (difference approx. 50 atmos.). As P₁ is say double the displacement of P₂ the two opposing torques acting on the motor are about equal. P₂I and P₁I are in communication at ports a and b and since the flow from both is toward the valve the pressure is substantially equal whereas the pressure at P₁D may be as low as that stated, due to the throttling action at port c. In order to maintain a proper pressure difference the valve 140 is provided. This may have one or more clearance cuts 141 and be provided with an enlarged head or piston 142 in cylinder 143 which is connected with port f and therefore with P₁I through passages 144 and 145, whereas the lower end of said piston valve 140 is through passage 146 subjected to the pressure of P₂D. The ratio of the area of the piston 140 to piston 142 is selected as inversely to the pressure ratios desired. Thus if the pressure desired in space 146 is three times that in space 145 (i. e., port f, passage F and P₁I) the area of piston 140 is made one third of the area of piston 142. If the pressure in 145 should drop below one third of the pressure in 146 the valve moves to the right, opening a passage at 141 (in parallel with the throttling passage at f) thus allowing oil to flow through 141 into passage 145 and raising the pressure to the desired point. When the desired pressure ratio has been reached the pressure in 145 acting on piston 142 overcomes the pressure in 146 acting on the piston 140 and shuts off the passage 141. The piston valve 140 will therefore always be so positioned as to automatically provide for the desired pressure ratios, so that the forward and reverse torque acting on the motor flywheel will be balanced. The passage e is merely provided to connect the space 146 with the port d (connected to P₂D).

In order to provide for progressive braking the piston 150 is provided. This is subjected to the pressure in P₂D and its motion may be limited as by the enlarged head 151. This piston or plunger 150 is so located or connected that when the valves V move from the "neutral" to the "braking" position the plunger is moved against the pressure of P₂D. In this way vigorous braking occurs only when the operator applies a strong pressure to pedal FP, since the hydraulic braking pressure reacts against pedal FP. In this way too vigorous braking is avoided and the retarding torque is generally proportional to the pressure applied by the operator to pedal FP. The head 151 is not at all necessary as it may be desirable to have the plunger 150 act not only during hydraulic braking but also in one or more of the other positions of valves V.

In addition, or in the alternative, a relief valve may be appropriately placed as between P₁I and P₁D. As shown in Fig. 9 this may be a check valve 160 held in place on its seat by a normally lightly tensioned spring 161 which is backed up by the plunger 162, the rear side of which is subjected to the pressure of P₁I. In view of this arrangement, a smooth retarding effect can be produced by moving the pedal FP to the low ratio position in which event there will be momentary "free wheeling" but as the pressure in P₁I gradually increases and the tension on spring 161 increases the short circuit flow is gradually decreased so that the motor acts as a brake for the car. This is especially valuable in descending long hills. If a more vigorous braking is desired this can be accomplished by pressing the pedal FP to the hydraulic braking position.

A modified form of relief valve is shown in Fig. 9a which differs only in that the spring 161a normally bears on the valve member 160a with considerable pressure and there is no pressure controlled means for increasing the spring tension.

Both forms of valve have as an object that depression of pedal FP when the car is traveling at high speed cannot suddenly apply a large reverse torque which might result in skidding or other serious accident. If the port of these valves of Fig. 9a is made sufficiently large "free wheeling" action is available.

With certain motors the lubricating oil pressure rises very rapidly, particularly when very cold, so that shifting from neutral to low gear may occur too early. To avoid this it may be desirable to provide a speed controlled bleeder valve. This valve may be controlled by speed in any desired way but it is preferred to utilize the generator current for this purpose. To this end a valve 170 may be provided of any suitable construction which will normally keep open a passage from the passage 88 to the crankcase or other oil reservoir. Said valve may be closed by magnetic means such as by an armature 171 cooperating with a coil 172 in series or parallel with the circuit of the generator 173. This assures that the shift from neutral to low cannot occur until a certain engine speed has been reached.

It may be desirable to assure that when the piston 61' and/or the parts actuated thereby has moved part of the way from one position to the other at least as between "neutral," "low," "direct" and "over-drive," the motion be completed, so that the valves V cannot remain, for any length of time, in an intermediate position. This may be accomplished by providing a detent device such as a serrated member 175 carried by the lower end of lever 60a cooperating with a spring pressed detent plunger 176 shiftably supported in a stationary cylinder 177.

The hydraulic transmission described above may, of course, be used in connection with a mechanical transmission to achieve either direct drive from the power delivery shaft 32 to the Cardan shaft 200 or to achieve a reduced drive or a reverse. Any suitable mechanical transmission may be utilized. In the drawings, this may consist of a gear member 260 attached to the rearward end of shaft 32, which gear 260 is continually in mesh with the gear 264 suitably mounted in the transmission housing. To said gear 264 is rigidly connected a gear 265 as shown. Splined to the Cardan shaft 200 is a gear member 266 having spur gear teeth 263 and internal teeth 262 which may cooperate with external teeth 261 on the member 260. It will be noted that if the gear member 266 is in the forward position the teeth 261 and 262 will interengage, causing the shaft 32 to drive the shaft 200 in a forward direction and at the same speed. However, if gear 266 is moved to its extreme rear position teeth 262 will be disengaged from teeth 261, and gear teeth 263 will engage with gear 265 so that shaft 200 will be rotated forwardly at reduced speed; through gear elements 260, 264, 265 and 263. If the member 266 is left in an intermediate position and the gear 272, splined to shaft 200, is shifted to engage the gear 273a the shaft 200 will be operated in reverse direction. This is effected through gear 273 fixedly connected with gear 273a and which is constantly in mesh with gear 265. These elements and the shifter plates 266a and 272a as well as the shifter 271 are well known and form no part of the present invention and need therefore not be described further. As shown the member 200 preferably carries a gear 280 meshing with gear 281 mounted to turn shaft 282 for driving the oil pump CP shown in Fig. 9.

The modified form of valve control mechanism shown in Fig. 10 will now be described. This construction differs from the one shown in Fig. 9 in that there is no oil pump driven by the Cardan shaft. Instead there is a single pump 300, driven preferably by the power supply shaft, i. e. the engine shaft. In the form shown this pump comprises a central gear 301 meshing continuously with the gears 302 and 303 and forming with said gears 302 and 303 respectively a double gear pump. As shown the pump 301—303 has connected thereto an intake pipe 304 and a delivery pipe 306 connecting with tube 308, an extension 310 of which connects with a fluid pressure actuated device for shifting the position of the valves V. This device may comprise piston 61', cylinder 61, spring 62, spring support 63, and an adjustment device such as set screw 64, these parts being shown as identical with corresponding parts in Fig. 9. Tube 306 preferably connects also with tube 312 connected to pressure relief valve 314 having a passage or tube 316 connecting to the oil reservoir 318. The purpose of the pressure relief valve 314 is to assure that the pressure in the pump system does not exceed a certain value.

The pump 301—302 has an intake tube 320 and a delivery tube 322 connecting with oil supply passage 73 for supplying oil to the motor bearings, etc., and with passage 372 corresponding with passage 72 in Fig. 9, which passage 372 connects via check valve 74 with the passages 75 and 75a already described in connection with Fig. 9. The numeral 330 designates generally a metering valve which may consist of a cylinder 332 containing a piston 334 urged to the right by spring 336. Said piston 334 is adapted to cooperate with a generally triangular cutaway portion 338. Tube 308 connects with tube 340 to permit entry of oil to the metering valve whereas tube 85 serves as an oil delivery passage from the valve to the passage 75. It will be seen, therefore, that pump 301—302 serves primarily to supply oil to the engine bearings and to keep the hydraulic transmission properly filled. Pump 301—303 pumps oil or other working fluid through passages 306, 308, 340, metering valve 330, and passage 85 into the transmission.

In any given position of metering valve 330 the pressure in the system will be in some proportion to the speed of the power supply shaft and through passage 310 pressure is applied to the piston 61'. Said piston 61' may be connected to operate an arm 350 which is connected for operating the spiders 80 and therethrough the valves V in the manner described above. These connections may be via arm 352 which may conveniently serve to cooperate with the spring FS which serves the same purpose as the spring FS in Fig. 9.

If it is desired to control the position of the metering valve 330 from the throttle opening the accelerator pedal AP may be provided with a connection 113 for shifting the piston 334. This may be by direct connection, although it is preferred to provide a manual setting device such as the arm 115a settable over a scale 116a, the upper end thereof serving as an abutment for the lever of the second class 112a, to the other end of which is attached the link 113 and which carries intermediate its ends some means for adjusting the position of piston 334. Insofar as the mechanism described up to this point is concerned this may be any connecting element 354, shown as wedge shaped, for reasons to be now given.

If in the operation of the device described so far, the motor speed reached should be such as to cause shifting to a higher gear ratio the engine speed would immediately be reduced (by the application of increased load) resulting in a reduction in the oil pressure in cylinder 61 which might permit the return of valves V to the lower speed ratio position. In order to prevent this, means have been provided to assure that when a shift of the valve operating mechanism occurs, whether this is to be toward higher speed ratios or toward lower speed ratios, the metering valve 330 will be adjusted to favor the shift which is taking place. A mechanism for this purpose is shown more or less schematically and may comprise a rod 356 carrying the wedge member 354. Suitable friction gripping means for said rod are provided which may comprise a cylinder 358, supported upon any stationary part of the vehicle, and a piston 360 operated by arm 362 having a detent 364 cooperating with a series of notches 366 in any suitable member 367 connected for operation with the member 350. The cylinder 358 may be provided with any suitable abutment as the edge 359 of an opening therein between which and the piston 360, the rod 356 is gripped. The member 367 may have an extension 368 which through suitable means, such as link 370, connects with a friction gripping device 372 associated with rod 356. This device may consist of a cylinder 373 provided with a spring pressed detent 374, as shown.

The operation of this control mechanism will now be described. In the position shown the valves V are in neutral. Assuming that the engine speed is increased to a point at which, in the assumed position of valve 330, the oil pressure in 308—310 reaches a point at which the piston 61' is operated and the valves V slowly shifted to higher gear position, the member 367 will be moved clockwise. During this motion the arm 362—364 will be momentarily rocked counterclockwise as the detent shifts from the notch shown into the next higher one. During this period the rod 356 is released for motion. At the same time the arm 368 is being shifted downward causing members 370 and 372 to be shifted downwardly thereby shifting the rod 356 downwardly. This results in a downward motion of wedge 354 which causes the metering valve to be slightly closed, thereby increasing the oil pressure in 308—310, or at least preventing the drop in speed of the motor from causing a decrease in the oil pressure. The same effect occurs during shifting to still higher speed ratios.

Assuming that the valves V positioned for one of the higher speed ratios and the engine speed drops below a certain point, a decrease in oil pressure will cause the valves V to be shifted to a lower speed ratio position. During this time the gripping element 360 is temporarily released permitting the upward shifting of member 372 to raise the rod 356 and wedge 354 and thereby cause the metering valve 330 to be opened further so as to compensate for the increase in engine speed which will now occur.

It will be seen, therefore, that the metering valve 330 may be controlled by (a) throttle opening; (b) the manual setting device 115a; and (c) by changes in the position of the valves V. Furthermore, the mechanism always works in favor of maintaining the position to which the latest shift has occurred whereby unnnecessary shifting of valves V or "hunting" is avoided.

The valve operating mechanism may also be manually controlled as by foot pedal 380 having a one-way connection with members 350, 352—367, as through the adjusting screw 382. The foot pedal 380 is preferably connected with member 367 as by spring 384 and is provided with a retaining dog 385 cooperating with one of a plurality of shoulders 386 located on stationary member 387. When the foot pedal 380 is in rearmost position the operation of the transmission is fully automatic but if the pedal is depressed the valves V may be forced to a lower speed ratio position such as direct, low or neutral and a further depression of the foot pedal will cause a compression of spring FS and the shifting of the valves to hydraulic braking position.

With reference to Fig. 9 it will, of course, be understood that the pumps EP and CP, as well as all the parts shown in full lines as connected therewith, are carried by the chassis whereas those elements shown in dotted lines are carried by the rotating part of the transmission. This is further evident because said figure shows that where a fluid passage passes from a stationary element to said rotating element a slip ring is provided as in the engine crank shaft bearing 21 or the oil emission passage as 77 from the rotating sleeve 28₁, to the collector ring 78.

Whereas I have illustrated and described only one form of hydraulic transmission and two forms of control mechanism therefor, it is to be understood that the invention is not to be limited to the forms shown which are merely illustrative and to some extent merely schematic.

What is claimed is:

1. In a hydraulic power transmission, a power supply shaft, a power delivery shaft, a hydraulic displacement device connected between said power supply and power delivery shafts and a second hydraulic displacement device connected between said power supply shaft and a stationary member, passages for working fluid connecting said devices, and valve means for controlling the flow of the working fluid, means responsive at certain times only to the speed of the power supply shaft and only to the speed of the power delivery shaft at other times for controlling said valve.

2. In a hydraulic power transmission, a power supply shaft, a power delivery shaft, a hydraulic displacement device connected between said power supply and power delivery shafts for causing said power supply shaft to operate said power delivery shaft at various speed ratios, passages for working fluid connecting said devices, and means for controlling the flow of the working fluid to vary said speed ratio said means comprising a working fluid controlling valve, a piston for moving said valve, a cylinder in which said piston operates, a pump driven by one of said shafts for circulating a fluid, a metering valve in said fluid circuit and a connection from a point in said fluid circuit between said pump and said metering valve and extending to said cylinder.

3. In a hydraulic power transmission, a power supply shaft, a power delivery shaft, a hydraulic displacement device connected between said power supply and power delivery shafts for causing said power supply shaft to operate said power delivery shaft at various speed ratios, passages for working fluid, and means for controlling the flow of the working fluid to vary said speed ratio, said means comprising a working fluid controlling valve, a piston for moving said valve, a cylinder in which said piston operates, a pump driven by one of said shafts for circulating a fluid, a metering valve in said fluid circuit and a connection from a point in said fluid circuit between said pump and said metering valve and extending to said cylinder, and manual means for controlling said metering valve.

4. In a hydraulic power transmission, a power supply shaft, a power delivery shaft, a hydraulic displacement device connected between said power supply and power delivery shafts for causing said power supply shaft to operate said power delivery shaft at various speed ratios, passages for working fluid, and means for controlling the flow of the working fluid to vary said speed ratio said means comprising a working fluid controlling valve, a piston for moving said valve, a cylinder in which said piston operates, a pump driven by one of said shafts for circulating a fluid, a metering valve in said fluid circuit and a connection from a point in said fluid circuit between said pump and said metering valve and extending to said cylinder, means for controlling the amount of power supplied to said power supply shaft and connections from said power supply controlling means for varying the setting of said metering valve.

5. In a hydraulic power transmission, a power supply shaft, a power delivery shaft, a hydraulic displacement device connected between said power supply and power delivery shafts for causing said power supply shaft to operate said power delivery shaft at various speed ratios, passages for working fluid, and means for controlling the flow of the working fluid to vary said speed ratio said means comprising a working fluid controlling valve, a piston for moving said valve, a cylinder in which said piston operates, a pump driven by one of said shafts for circulating a fluid, a metering valve in said fluid circuit and a connection from a point in said fluid circuit between said pump and said metering valve and extending to said cylinder, spring means to oppose the movement of the piston by said fluid and manual means to control said spring means.

6. In a hydraulic power transmission, a power supply shaft, a power delivery shaft, a hydraulic displacement device connected between said power supply and power delivery shafts for causing said power supply shaft to operate said power delivery shaft at various speed ratios, passages for working fluid, and means for controlling the flow of the working fluid to vary said speed ratio said means comprising a working fluid controlling valve, a piston for moving said valve, a cylinder in which said piston operates, a pump driven by one of said shafts for circulating a fluid, a metering valve in said fluid circuit and a connection from a point in said fluid circuit between said pump and said metering valve and extending to said cylinder, and means whereby the shifting of the fluid controlling valve from one position toward another causes the metering valve to be adjusted to favor said shifting.

7. In a combined hydraulic power transmission and hydraulic brake, a power supply shaft, a power delivery shaft, a hydraulic displacement device connected between said power supply and power delivery shafts and a second hydraulic displacement device connected between said power supply shaft and a stationary abutment, passages for working fluid connecting said devices, and means for controlling the flow of the working fluid so as at a certain time to block flow through said first device and to short circuit said second device, and at another time to partially block flow from said second device whereby a reverse torque is applied to the power supply shaft and means for applying an approximately equal forward torque to the power supply shaft.

8. In a combined hydraulic power transmission and hydraulic brake, a power supply shaft, a power delivery shaft, a hydraulic displacement device connected between said power supply and power delivery shafts and a second hydraulic displacement device connected between said power supply shaft and a stationary abutment, passages for working fluid connecting said devices, and means for controlling the flow of the working fluid so as to cause said power supply shaft to drive said power delivery shaft at various speed ratios and means operating against said abutment to apply a reverse torque to said power supply shaft and means for applying an approximately equal forward torque to the power supply shaft.

9. In a hydraulic power transmission, a power supply shaft, a power delivery shaft, a hydraulic displacement device connected between said power supply and power delivery shafts for causing said power supply shaft to operate said power delivery shaft at various speed ratios, passages for working fluid, and means for controlling the flow of the working fluid to vary said speed ratio said means comprising a working fluid controlling valve, a piston for moving said valve, a cylinder in which said piston operates, a pump driven by one of said shafts for circulating a fluid, a metering valve in said fluid circuit and a connection from a point in said fluid circuit between said pump and said metering valve and extending to said cylinder, and a speed controlled bleeder valve in said fluid circuit.

10. In a combined hydraulic power transmission and hydraulic brake, a power supply shaft, a power delivery shaft, a hydraulic displacement device connected between said power supply and power delivery shafts and a second hydraulic displacement device connected between said power supply shaft and a stationary abutment, passages for working fluid connecting said devices, and manual means for controlling the flow of the working fluid so as to apply a reverse torque to said power delivery shaft and means reacting against said manual means to an extent dependent upon the amount of said reverse torque.

HANS THOMA.